April 19, 1966  T. A. MIDDLESWORTH ET AL  3,246,714
ARTICULATED MODULAR VEHICLE
Filed March 8, 1962  4 Sheets-Sheet 1
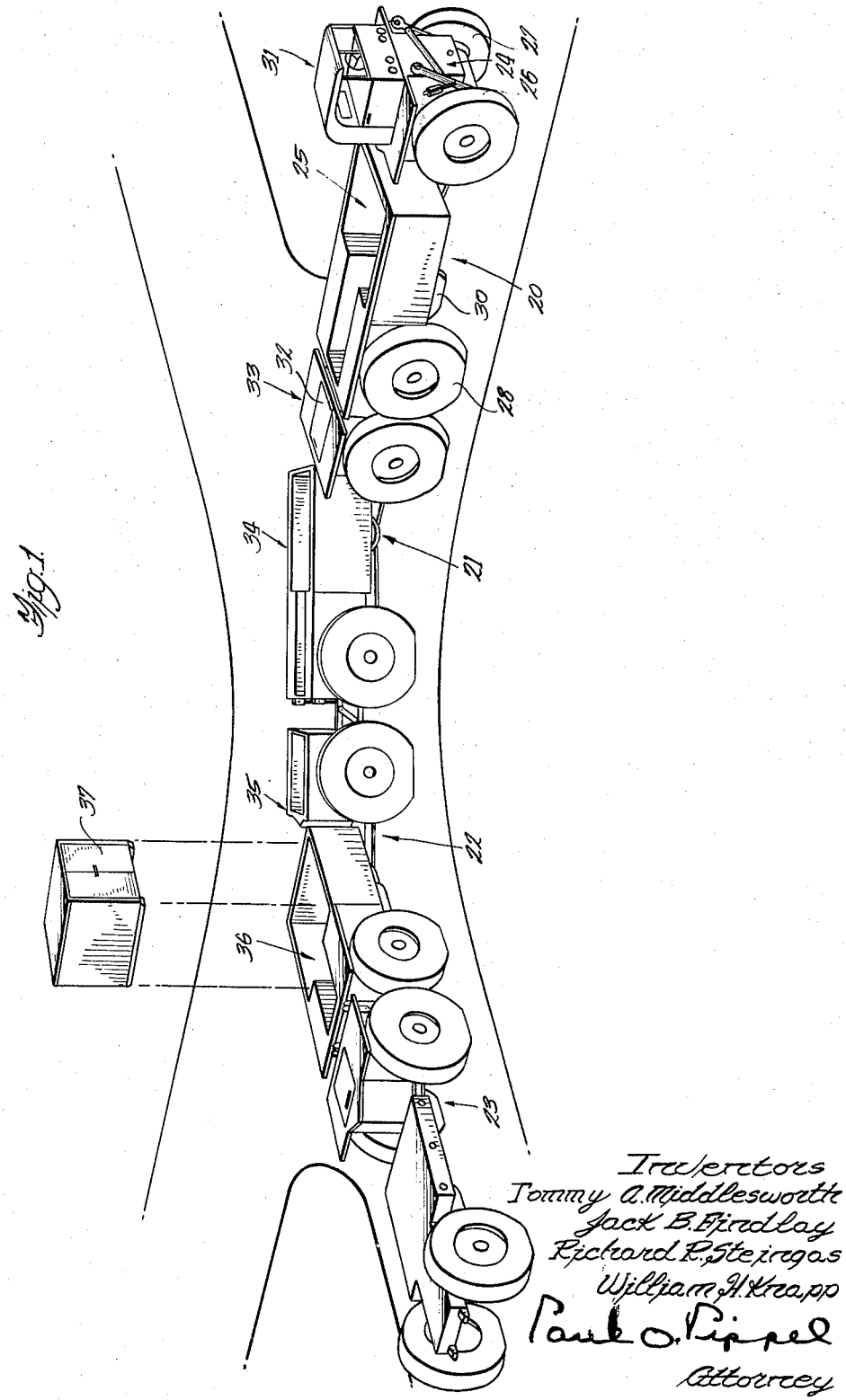
Inventors
Tommy A. Middlesworth
Jack B. Findlay
Richard R. Stejskas
William H. Knapp
Paul O. Pippel
Attorney

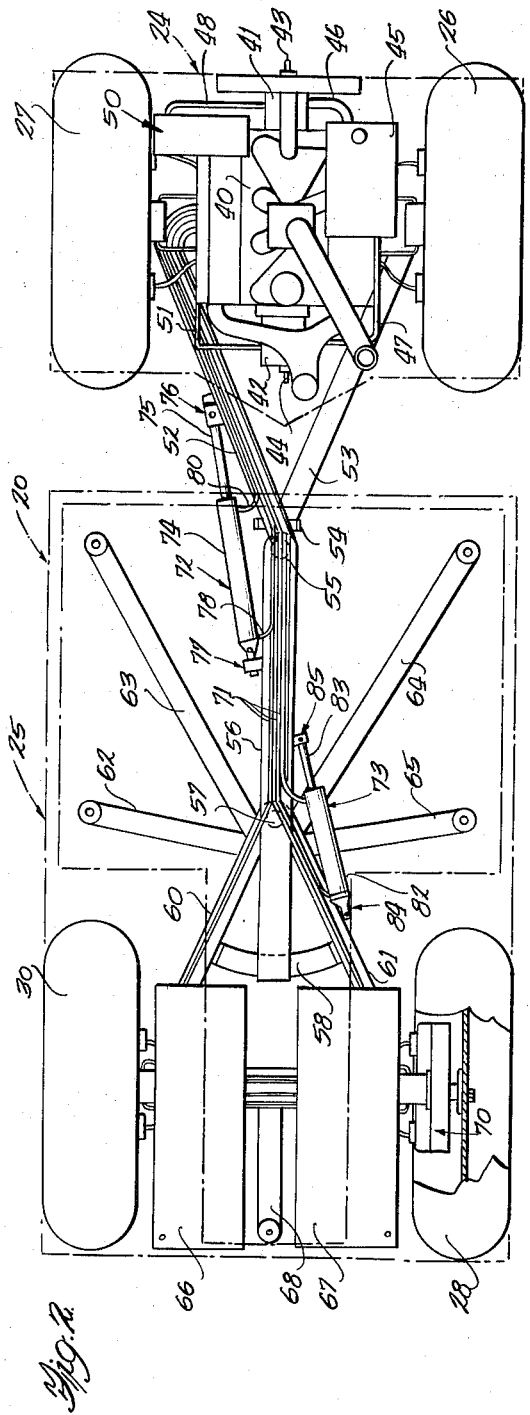

April 19, 1966  T. A. MIDDLESWORTH ET AL  3,246,714
ARTICULATED MODULAR VEHICLE
Filed March 8, 1962  4 Sheets-Sheet 3
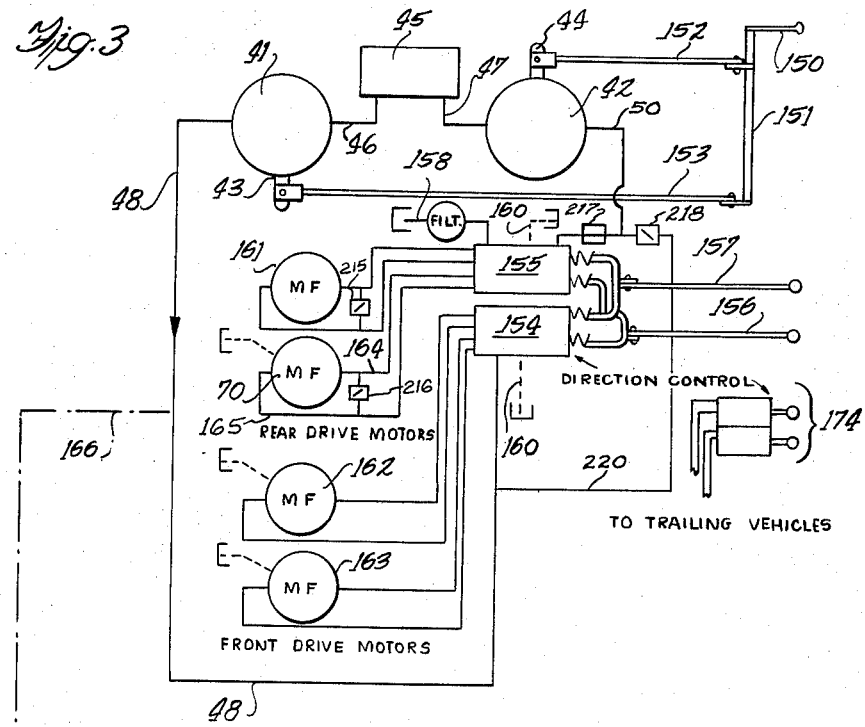
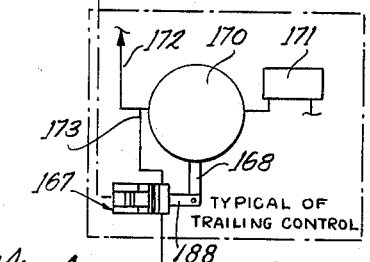
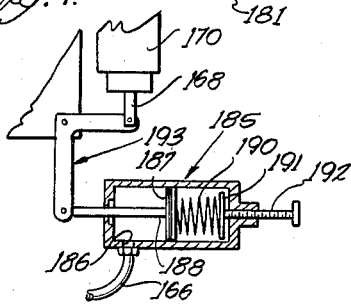
Inventors
Tommy A. Middlesworth
Jack B. Findlay
Richard R. Steiniges
William H. Krapp
Paul O. Pippel
Attorney April 19, 1966 T. A. MIDDLESWORTH ET AL 3,246,714
ARTICULATED MODULAR VEHICLE
Filed March 8, 1962 4 Sheets-Sheet 4

Inventors
Tommy A. Middlesworth
Jack B. Findlay
Richard R. Stejngas
William H. Knapp
Paul O. Pippel
Attorney

United States Patent Office 3,246,714
Patented Apr. 19, 1966

3,246,714
ARTICULATED MODULAR VEHICLE
Tommy A. Middlesworth, Hinsdale, Jack B. Findlay, Downers Grove, and Richard R. Steingas and William H. Knapp, Naperville, Ill., assignors to International Harvester Company, Chicago, Ill., a corporation of New Jersey
Filed Mar. 8, 1962, Ser. No. 178,294
6 Claims. (Cl. 180—14)

This invention is directed to the field of articulated modular vehicles which can be intercoupled to form a train of vehicles, and more particularly to vehicles suitable for withstanding a multiplicity of conditions in traversing difficult terrains such as encountered in military operations.

In the general class of vehicles suitable for assault and subsequent logistic support operations, the requirements imposed by the military are stringent indeed. It is requisite that such vehicles must be able to traverse any terrain such as mud, ash, sand, etc. and even withstand shocks such as imposed by a drop with a parachute. Further, the vehicle should be recoverable from a water drop by "swimming" to shore under its own propulsion power with sufficient steerageway to control its point of emergence from the water. Another important consideration is that such vehicles should be able to receive a package having standardized dimensions such as the "Conex" type containers and transport such containers without raising the effective center of gravity of the vehicle by a substantial amount.

It is therefore a primary object of the present invention to provide an articulated vehicle which is operable independently to satisfy all of the criteria defined above.

Another important object of the invention is the provision of such a vehicle which is modular, that is, readily intercoupled with other like vehicles to form a train of vehicles.

A salient object of the invention is the provision of such a vehicle which, when intercoupled to form a vehicle train, provides for positive and smooth operation of the train without any overrunning or chucking of the trailing vehicles with respect to the lead vehicle.

Of substantial importance is the provision on each vehicle of means for effecting control of such vehicle as the lead vehicle when it is the head-end vehicle of a train, and means for bypassing such control means to utilize the vehicle as a trailing vehicle.

Of significant importance to the successful provision of such a vehicle is the utilization of drive energy in such form that each vehicle can readily be operated as a four-wheel drive unit, as a two-wheel drive unit, or as a free-wheeling unit. Further, it is desirable that such drive energy be usable after effecting the propulsion of the wheels to operate auxiliary components as desired on each vehicle.

The foregoing and other objects of the invention are realized, in a preferred embodiment of the invention, by providing a vehicle with a hydrostatic drive arrangement. That is, a hydrostatic motor with clutching and declutching arrangement is provided at each wheel and intercoupled to each wheel, thereby to effect rotation of such wheel responsive to the transmission of fluid to the hydrostatic motor. Accordingly one or more variable-displacement pumps are provided, driven by the main engine in the vehicle, to supply fluid under pressure through a suitable valve or series of valves to the various drive motors. With such an arrangement, the fluid pressure can readily be translated from one to another vehicle through an entire train of vehicles, and differential pressure means utilized as will be explained hereinafter to provide a definite tractive tow between each pair of intercoupled vehicles, thereby to obviate chucking or overrunning between the vehicles. The fluid pressure thus affords energy which is available, even after all the hydrostatic motors at the wheels in a vehicle are driven, to perform a multiplicity of other tasks including positioning of the intercoupling arrangements, operation of auxiliary units such as bulldozer blades, cranes and winches, etc., in that same vehicle. Further, when a drive unit is inoperative, the unit can simply be bypassed so that no fluid is shunted to that particular drive motor, thus avoiding any waste of energy in the system. It is apparent that such shunting can be utilized to provide four-wheel drive, two-wheel drive, or provide a vehicle which does not receive any motive power but acts completely as a trailer.

FIGURE 1 is a perspective illustration depicting the manner in which a vehicle train composed of vehicles constructed in accordance with the inventive principles rounds a corner;

FIGURE 2 is a plan view, with the upper body portions removed, of a single articulated modular vehicle constructed in accordance with the invention;

FIGURE 3 is a schematic diagram depicting certain components of the fluid control system utilized in accordance with the inventive concepts;

FIGURE 4 is a diagrammatic illustration, partly in section, depicting another embodiment of one component illustrated in FIGURE 3;

Figure 5:
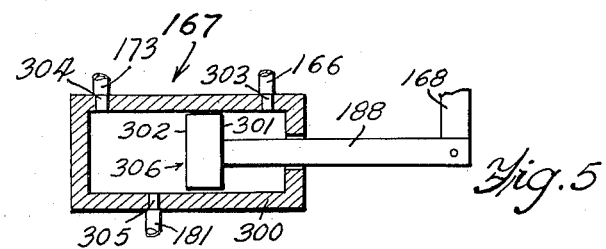
FIGURE 5 is a cross sectional view of one embodiment of the differential cylinder unit under normal operating conditions.

FIGURE 1 depicts a plurality of vehicles 20, 21, 22, and 23 constructed and intercoupled in accordance with the inventive principles to provide a vehicle train. The head end or lead vehicle 20 comprises a front unit 24 and a rear unit 25, with the designations "front" and "rear" referencing the unit components of the vehicle with respect to the normal direction of travel. The vehicle train is reversible, in that each vehicle can be backed by reversing the flow of oil through the motors as will be explained hereinafter. A pair of front wheels 26 and 27 support front unit 24 as illustrated, and a pair of rear wheels 28 and 30 support rear unit 25. A cab 31 is affixed to front unit 24 of vehicle 20, and as will become evident from the subsequent description, cab 31 is a completely demountable unit comprising seating, enclosure, and operating components which is readily affixed to any vehicle upon the simple upward lifting and removal of a closure panel, such as the panel 32 in front unit 33 of vehicle 21.

The illustration of FIGURE 1 indicates that rear unit 34 of the second vehicle 21 is positioned at an angle with respect to front unit 33 of the same vehicle, as the vehicle train moves around an obstacle or rounds a corner at an intersection. The third vehicle 22 in the train comprises a front unit 35 and a rear unit 36. As this vehicle rounds the corner, it is noted that there is an angular displacement or relationship between front unit 35 and rear unit 36. In accordance with an important aspect of the inventive teaching, rear unit 34 of vehicle 21 is intercoupled with front unit 35 of vehicle 22 so that these two units cooperate to form a bogie or an independent supporting unit. The specific components of the intercoupling between rear unit 34 and front unit 35 of the two different vehicles will be described and illustrated hereinafter. For the present purposes, it is sufficient to emphasize that the articulation or angular movement of the various vehicles of the train is effected between the individual units of each vehicle, such as units 33 and 34 of vehicle 21, as the train rounds the corner, but the intercoupling between vehicles is such as to cause the front unit of each vehicle to follow in line with the trailing unit of the preceding vehicle, thereby affording a bogie-type component. Such operation affords positive control and excellent following characteristics of each vehicle in the train as direction changes are effected from the lead vehicle.

In FIGURE 1, a container 37 is also illustrated, and this container is receivable within the well of the rear unit 36 of vehicle 22 in an obvious manner. Container 37 can be of a standardized shape and size such as the well-known Conex type and it is noted that the construction of the invention permits a Conex-type load to be carried with a relatively low center of gravity of the overall vehicle, rather than requiring mounting of the Conex container entirely above the uppermost portion of the vehicle tires.

In FIGURE 2, the lead vehicle 20 is illustrated, with the cab and structural plate components removed, to illustrate the articulation of the vehicle and the mounting of major components thereon. In the front portion, a conventional internal-combustion engine 40 is positioned, and a pair of variable-displacement pumps 41 and 42 are affixed thereto so that operation of the engine 40 is effective to displace the actuator units within the pumps 41 and 42. Each of pumps 41 and 42 includes a projecting stem or control element, referenced by numerals 43 and 44 respectively, which are operable to various positions to regulate the displacement of fluid flow through each of the pumps in a manner that will be described hereinafter in connection with FIGURE 3. An oil reservoir 45 (FIGURE 2) is provided to supply oil, the operating fluid of the illustrated embodiment, through lines 46 and 47 to pumps 41 and 42, respectively. From pump 41 another oil line 48 provides an intercoupling with a bank of control valves 50, and another line 51 intercouples pump 42 with other control valves in the same bank.

Rear tire 28 is broken away, indicating generally the manner in which one of the hydrostatic drive motors 70 is supported adjacent the extremity of the axle to drive the wheel. Responsive to receipt of fluid transmitted from front unit 24 through one of lines 71 to hydrostatic motor 70, angular rotation of rear wheel 28 is effected. The gear components are in a reduction box to which the hydraulic motor is attached, there being no gear reduction within the hydraulic motor itself. Shifting may be accomplished by engaging clutches on constant mesh gears, thereby eliminating the shifting of gear components. Inasmuch as such hydrostatic motors, together with the variable-displacement pumps already referred to, are of a conventional type, a more specific disclosure or explanation of such units is not set forth. For a complete disclosure of such a hydraulic motor reference may be made to Patent No. 2,649,741 to K. Kenrichsen of August 25, 1953. For a complete disclosure of such a variable displacement pump reference may be made to Patent No. 2,714,346 to M. E. Valin of August 2, 1955.

In FIGURE 3 the hydraulic control system is illustrated, and certain components such as reservoir 45 and pumps 41 and 42 are also illustrated in FIGURE 2. The displacement through these pump is regulated by the respective stems 43 and 44. Accordingly a control handle 150 and a post 151 are provided as indicated, with an upper link 152 being intercoupled between post 151 and stem 44 of pump 42, and a lower link 153 affording a similar intercoupling between the post and stem 43 of the other pump. Thus the adjustment of the position of control handle 150 is effective to vary the displacement through line 48 to directional control valve 154, and likewise to vary the displacement from pump 42 through line 50 and normally-open valve 217 to the other directional control valve 155. Valves 154 and 155 are of the "flow-through" type. That is, with the direction control steering handles 156 and 157 in their neutral positions, the fluid passing over lines 48 and 50 to the control valves passes through the center of these valves and out through the return line 158 to reservoir 45, the reservoir being indicated by the U-shaped symbol at the end of line 158. A filter is provided in this line in conventional manner. A plurality of additional return lines 160, each indicated by a broken line and U-shaped symbol, are provided to catch any leakage in the valves and return the flow of oil thus obtained to a point in the reservoir above the oil level.

As referred to previously, the vehicles can be backed by reversing the flow of oil through the motors. Such reversal is readily effected by actuating handles 156 and 157 of control valves 154 and 155.

In addition to the rear drive motor 70 indicated in FIGURE 2, FIGURE 3 also depicts the other rear drive motor 161, and a pair of front drive motors 162 and 163 each disposed adjacent an individual wheel as described above. The legend "MF" identifies a fluid-driven motor. Each of valves 215 and 216, connected in shunt respectively of motors 161 and 70, can be opened to provide oil recirculation within a rotating motor when no oil is being supplied by the control valve. Thus, with the control handles 156 and 157 in their thrown positions, oil can flow from reservoir 45 through line 47, pump 42, line 50, valve 217, the center of valve 155, line 164, rear drive motor 70, line 165, valve 155, and through the filter in line 158 back to reservoir 45. Similar flows are provided over the lines indicated to each of the other three motors. At all times oil flows downstream from a control valve, with the displacement being determined by the setting of the stem on the pump associated with the valve. It is thus apparent that a speed regulation is afforded by manipulation of control handle 150, thereby to vary the displacement from the pumps 41 and 42 to the drive motors. Moreover, with a constant fluid flow from the pumps to the control valves, this flow can be unbalanced by manipulation of one or other of the control handles 156 and 157 to increase or retard the flow only to the left front and rear drive motors, or only to the right front and rear drive motors. If the wheels on one side are retarded, there is a braking effect at that side of the vehicle and a turning effect toward that side. Thus a skid-type steering is readily afforded with the hydrostatic drive motors in the system indicated.

Figure 6:
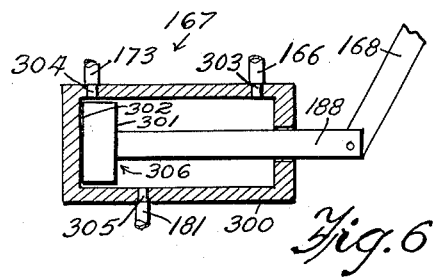
FIGURE 6 is a cross sectional view of the differential cylinder unit shown in FIGURE 5 showing the position of the piston when its corresponding pump is inoperative.

Another improtant feature of the vehicle train arrangement of the invention will now be described, and it is emphasized that the provision of such feature with the illustrated drive and control systems prevents chucking or overrunning of the vehicles in the train, by keeping a positive tractive force between each pair of coupled vehicles. A cylindrical assembly designated 167 is shown schematically in the circuit diagram of FIGURE 3. The embodiment shown in this schematic is illustrated in detail in FIGURES 5 and 6 and the details of another embodiment are shown in FIGURE 4. It should be noted that the embodiment shown in FIGURE 4 does not require the equivalent of the balance line 173 or the interconnecting line 181. More specifically, a pilot line 166 is coupled to line 48 in the control system, and line 166 contains fluid at a pressure equal to that in line 48. This pressure is applied to one side of the barrel 300 through a first input port 303 of the cylinder assembly 167, disposed in the control unit of the trailing vehicle. For example, such control system would be in vehicle 21 following vehicle 20 in the train illustrated in FIGURE 1. The piston rod 188 of piston 306 of assembly 167 (FIGURE 3) is coupled to stem 168 of a variable-displacement pump unit 170, similar to pumps 41 and 42. Adjustment of the position of stem 168 regulates the displacement from reservoir 171 through pump 170 and out line 172, through the control valves and to the drive motors of such vehicle. Referring now to FIGURES 3, 5 and 6, a balance line 173 is provided between main line 172 and a second input port 304 of the cylinder barrel 300 in assembly 167. The cylinder assembly 167 is a differential cylinder, arranged so that a lesser pressure in line 173 balances a greater pressure incoming from pilot line 166, and to the drive motors is balanced to regulate the pump unit in the trailing vehicle such that it is operating at a lower displacement than the pump in the lead vehicle. Accordingly, a positive tractive force differential is provided between the lead and following vehicle to avoid chucking or overrunning in the vehicle train. By providing a similar differential cylinder in each subsequent vehicle, a similar force differential is utilized for a proper following action of all the vehicles in the train. Such a differential cylinder is readily provided, and may be by way of example a cylinder barrel 300 with a piston having a rod 188 extending from only one side of the piston face. With such a construction, there is a lesser active area on the side 301 of the piston face to which the rod 188 is affixed than there is on the opposite face 302 of the piston, thereby providing the required differential. Under normal conditions (as shown in FIGURE 5) interconnect line 181 provides the means for passing the fluid pressure present in line 172 to the next following vehicle. In other words it functions as does pilot line 166. However in the event of engine failure in one vehicle the control pressure of the vehicle preceding the disabled vehicle is passed to the vehicle following the disabled vehicle. See FIGURE 6. Since there is no pressure on face 302 of the piston, the pressure on face 301 shifts the piston to the left (as seen in FIGURE 6) and permits fluid flow from port 303 to output port 305. With the engine failure, the full control pressure received over line 166 from the lead vehicle is transmitted through output port 305 over line 181 to the next following vehicle. Under normal operating conditions, however, the pressure transmitted over line 181 is less than the pressure applied over the incoming pilot line 166. The pressure of the fluid in the lines such as 48 and 50 is determined by the resistance to flow present in the hydraulic circuit. Thus the more work required to be performed by the drive motors 70, 161, 162 and 163 the higher the pressure in lines 48 and 50. Since the drive motors of the lead vehicle 20 function not only to drive the vehicle 20 but also to tow or pull the trailing vehicle 21 it follows that the drive motors (represented in FIGURE 3 as motor 170) of trailing vehicle 21 are not required to perform as much work as are the drive motors of vehicle 20. Since the drive motors 170 of the vehicle 21 do not perform as much work as the drive motors of vehicle 20 the fluid pressure in line 172 will be less than the fluid pressure in line 48, and the cylinder assembly 167 will be balanced. Another embodiment of a differential cylinder will be described hereinafter in connection with FIGURE 4.

Four-wheel drive of a vehicle is provided with the various valves in the positions depicted in FIGURE 3. If it is desired to provide only two-wheel drive, then valves 215 and 216 are actuated to their respective opened positions, thereby effectively bypassing rear drive motors 161 and 70. Accordingly considerable flexibility is provided with the arrangement of the invention.

Further, an auxiliary line 220 is provided and this line includes a normally-closed valve 218. When valve 218 is opened and valve 217 is opened, line 220 intercouples control valve 155 and feed line 48 which leads to control valve 154. In the event that pump 41 fails, bypass valves 215 and 216 can be opened to provide a recirculation path for each of the rear drive motors. Tractive force for the vehicle is still supplied with the fluid under pressure being passed from pump 42 through valve 218, line 220, and control valve 154 to the front drive motors 162 and 163. Should pump 42 fail, then fluid from pump 41 still powers front drive motors 162 and 163. Accordingly the front drive motors can always be driven if one of the main pumps should fail.

FIGURE 4 shows another embodiment of a differential cylinder assembly utilized to translate a control pressure from pilot line 166 into a desired displacement of stem 168 of pump 170. As there shown, a differential cylinder assembly 185 includes an input port 186 shown coupled with the pilot line 166, a piston 187 having a piston rod 188 affixed thereto, and a spring member 190 positioned between the other side of piston 187 and an end plate 191, which end plate is affixed to an adjusting screw 192. As the adjusting screw is rotated within a correspondingly tapped portion of the barrel in the cylinder assembly, the effective pressure provided by spring 190 on one side of piston 187 is varied, thereby varying the effective displacement of the piston which will be provided with a given pressure sent through pilot line 166. Movement of piston rod 188 is translated over a bellcrank assembly 193 into a related displacement of stem 168 of the pump. Thus the embodiment of a differential cylinder illustrated in FIGURE 4 affords a means for providing each vehicle with an adjustment for regulating the precise amount of tractive force which will be supplied between each pair of intercoupled vehicles, thereby to afford greater or lesser drag of each trailing vehicle on the preceding vehicle in the train.

*Conclusion*

The novel vehicle of the invention satisfies a multiplicity of stringent military requirements by utilizing a construction radically different from conventional vehicle configurations. In the first instance, a conventional spring hung chassis has not been utilized, but springing is achieved by utilizing large, low pressure tires with pressures in the range of, for example, from 5 to 20 pounds per square inch. In addition, an important part of the invention is the utilization of the "power wheel" concept, with a hydrostatic drive motor independently associated with each of the four wheels in the vehicle. This is most important inasmuch as a sealed final drive protects the vehicle against the hazards of water, mud, sand, ash, vegetation, etc., in a manner that could not be obtained with conventional arrangements utilizing universal joints and other conventional components. The independent hydrostatic units require minimum service, and replacement of an entire pump or motor unit is simple and rapid. A wheel or skid type steering is readily afforded by retarding the angular velocity of the wheels at one or other side of the vehicle. Also positive declutching at each wheel is possible, thereby to permit towing of disabled units.

Another important advantage obtained with the invention is the provision of positive coupling tension between each pair of intercoupled vehicles in the train, thus to prevent chucking and overrunning of the vehicles as they are driven. Positive acting, manually operated cutout valves are provided to afford operation of each unit as a four-wheel drive unit, as a two-wheel drive vehicle, or as a trailing vehicle with no positive drive.

While only a particular embodiment of the invention has been described and illustrated, it is apparent that modifications and alterations may be made therein. It is therefore the intention in the appended claims to cover all such modifications and alterations as may fall within the true spirit and scope of the invention.

What is claimed is:

1. In a vehicle train including a lead vehicle having a main supply line for passing fluid from a pump operating at a given pressure and displacement to at least one fluid motor, and a trailing vehicle coupled to said lead vehicle and also including a fluid line for normally transferring fluid from a pump operating at a pressure and displacement less than said given pressure and displacement to at least one fluid motor in said trailing vehicle, the pump in said trailing vehicle having a control element for regulating its displacement, the improvement which comprises:

a differential unit, coupled to said control element of the pump in said trailing vehicle and also coupled to said fluid line in the trailing vehicle, for regulating the position of said control element to provide a displacement of said pump of the trailing vehicle which is less than said given displacement;

and a pilot line, coupled between said main supply line of the leading vehicle and said differential unit of the trailing vehicle, for applying a reference input pressure through said pilot line, equal to said given pressure, to said differential unit against which the pressure in the fluid line of said trailing vehicle is compared, whereby the displacement of the pump of said trailing vehicle is always less than the displacement of the pump of said lead vehicle, thereby to provide a positive tractive force between said leading vehicle and said trailing vehicle.

2. For use in a vehicle train in which a lead vehicle and each trailing vehicle is powered by a plurality of fluid motors driven by fluid passed thereto over a main line from a pump, each pump having a control element, the improvement which comprises:

a differential cylinder assembly positioned in a trailing vehicle and having a first port, a second port, and a movable piston having a piston rod, the movement of said piston rod being stable when the pressure at said second port is less than the value of the pressure at said first port;

means including a pilot line for intercoupling the main fluid line of the lead vehicle with said first port of the differential cylinder assembly to provide a reference pressure value thereat;

means, including an auxiliary line, for coupling said second port with the main fluid line of said trailing vehicle, to provide at said second port a pressure value related to the value of the fluid transferred to the motors in said trailing vehicle;

and means for intercoupling said rod with the control element of the pump in said trailing vehicle, whereby said control element assumes a stable position when the fluid pressure to the motors in the trailing vehicle is less than the fluid pressure in the main line of the leading vehicle, thereby maintaining a positive force differential between the leading and trailing vehicles to prevent chucking and overrunning.

3. In a vehicle train in which a lead vehicle includes a pump, a main fliud line, said pump adapted to supply fluid to said main fluid line at a selected displacement, and at least one drive motor coupled to said line for imparting angular displacement to an associated wheel, and a trailing vehicle likewise comprising a pump for supplying fluid at a selected displacement to a fluid line coupled to said pump, and at least one fluid motor coupled to said line for effecting angular displacement of an associated wheel, the torque imparted to each wheel being a function of the fluid flow in the respective line coupled to each fluid motor, and a control element coupled to each pump for regulating its displacement, means for maintaining the pump displacement of said trailing vehicle at a value lower than the fluid pump displacement in the leading vehicle, comprising:

a control unit including a first input port for receiving fluid at a reference pressure, an actuator displaceable in response to the pressure at said first input port, and a second input port for applying a reaction pressure to effect a stabilization of said actuator responsive to a pressure at said second port which is lower than the pressure at said first port, means including a pilot line for intercoupling said first port with the main fluid line of the lead vehicle, means including an auxiliary line for intercoupling said second port with the main fluid line of said trailing vehicle, and means for intercoupling said actuator of the pressure unbalance unit with the control element of the pump in said trailing vehicle, whereby the fluid displacement of the pump in said trailing vehicle is always maintained at a value less than the displacement of the pump supplying fluid to the motor in the leading vehicle.

4. For use in a vehicle train comprising at least three intercoupled vehicles in which each vehicle includes an engine and at least one drive motor for energization by a fluid under pressure, the improvement which comprises:

differential pressure means in the second of said vehicles, including fluid transfer means connecting said drive motor of the first vehicle with said differential pressure means and fluid transfer means connecting said differential pressure means with the motor of said third vehicle, for receiving an input control pressure from the first vehicle and for translating an output regulating pressure to the third vehicle, the value of said output regulating pressure being less than the value of said input control pressure when the engine in said second vehicle is operating normally, and the value of said output regulating pressure being substantially equal to the value of the input control pressure responsive to failure of the engine in said second vehicle.

5. For use in a vehicle train having a plurality of vehicles intercoupled in series arrangement including a leading vehicle, a given vehicle and a trailing vehicle, each vehicle having at least an engine and one fluid-operated motor for energization by a fluid-operated motor for energization by a fluid under pressure, the improvement comprising:

means in said given vehicle including a differential cylinder arrangement having a first input port for receiving a control pressure from said leading vehicle, fluid transfer means connecting the motor of said leading vehicle with said first input port, a second input port for receiving a governing pressure from the motor of said given vehicle, and an output port for translating a regulating pressure to the motor of said trailing vehicle, fluid transfer means connecting said output port with the motor of said trailing vehicle, the regulating pressure translated to the trailing vehicle being less than the control pressure received from the leading vehicle when the engine in the given vehicle is operating normally, and the regulating pressure translated to the trailing vehicle being equal to the input control pressure from the leading vehicle responsive to failure of the engine in said given vehicle.

6. In a vehicle train including a lead vehicle having a main supply line for passing fluid at a given pressure and displacement from a pump in said lead vehicle to at least one fluid motor in said lead vehicle, and a trailing vehicle coupled to said lead vehicle and also including a fluid line for normally transferring fluid from a pump in said trailing vehicle at a pressure and displacement less than said given pressure and displacement to at least one fluid motor in said trailing vehicle, the pump in said trailing vehicle having a control element for regulating its displacement, the improvement which comprises: a differential unit including a cylinder having a piston slidably mounted therein, said piston connected to said control element for regulating the displacement of the pump of said trailing vehicle, said piston having a first face having a given area and a second face having a larger area than said given area, a pilot line connected between said main supply line of the leading vehicle and said cylinder and adapted to apply a fluid pressure against said first face of said piston, a line connecting the pump in said trailing vehicle with said differential unit and adapted to apply a fluid pressure against said second face in opposition to the pressure being applied against said first face to thereby regulate the pump in said trailing vehicle and control the effective tractive force difference between the lead and trailing vehicles.

References Cited by the Examiner

UNITED STATES PATENTS

| | | | |
|---|---|---|---|
| 1,566,726 | 12/1925 | Bradley | 180—14 |
| 1,877,091 | 9/1932 | Vickers | 103—11 |
| 2,134,628 | 10/1938 | Verney | 280—408 |
| 2,177,098 | 10/1939 | Doe et al. | 103—38 |
| 2,186,848 | 1/1940 | Uhlir | 280—408 |
| 2,238,061 | 4/1941 | Kendrick | 103—120 |
| 2,248,076 | 7/1941 | Harrington | 103—38 |
| 2,406,944 | 9/1946 | Choate et al. | 180—51 |
| 2,765,862 | 10/1956 | Tucker | 180—51 |
| 2,933,143 | 4/1960 | Robinson et al. | 180—14 |
| 3,031,208 | 4/1962 | Abbott | 280—460 |
| 3,033,593 | 5/1962 | Zaha | 280—460 |

FOREIGN PATENTS 697,541  9/1953  Great Britain.

LEO FRIAGLIA, *Primary Examiner.*

A. HARRY LEVY, *Examiner.*

R. C. PODWIL, *Assistant Examiner.*